Patented May 4, 1943

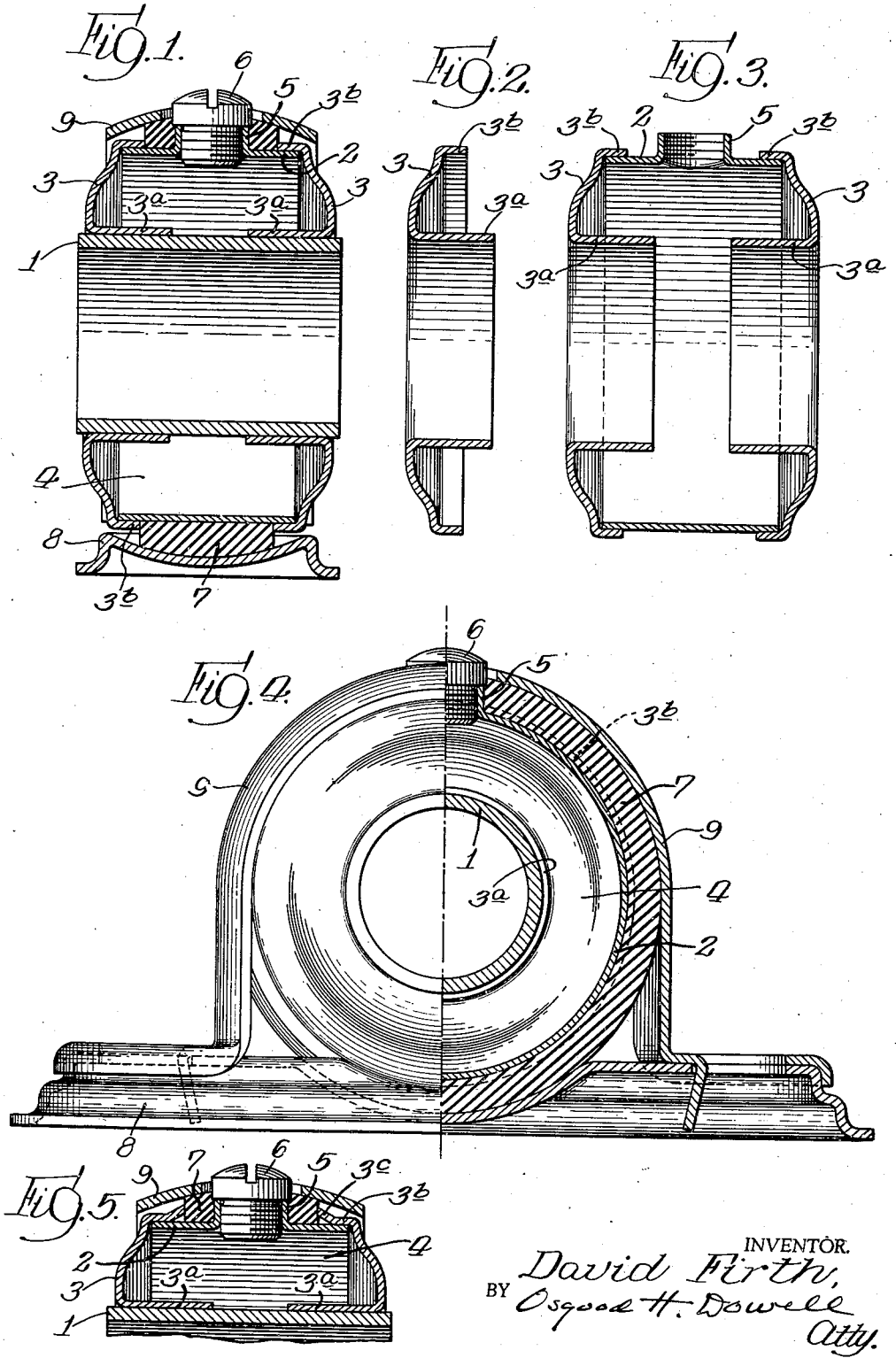

2,318,477

UNITED STATES PATENT OFFICE 2,318,477

SHAFT BEARING

David Firth, South Bend, Ind., assignor to Dodge Manufacturing Corporation, Mishawaka, Ind., a corporation of Indiana Application February 28, 1941, Serial No. 381,115

10 Claims. (Cl. 308—26)

This invention relates to shaft bearings. An object thereof is to provide an improved construction for a plain type bearing, namely one in which the shaft is journalled in a bushing fitted as a liner in the shaft bore of a bearing housing. A further object of the invention pertains to the type of bearing structure which comprises inner and outer housings and an interposed sound insulating and cushioning ring, the inner housing having ball and socket type mounting in the outer housing to permit self-adaptation of the bearing to the shaft alignment. The invention aims to improve this type of bearing structure more particularly with reference to the construction of the inner housing and the unit of which it forms a part; and further to improve the type of construction in which the cushioning ring, having a spherical outer surface in contact with a correspondingly spherical interior surface of the outer housing, is laterally confined between shoulders on the inner housing for retaining the ring against axial displacement relative thereto, the inner housing and cushioning ring as a unit being capable of ball joint motion in the outer housing.

The nature and advantages of the invention will be best understood by reference to one practicable bearing structure containing an embodiment of the invention, shown for illustration in the accompanying drawing wherein:

Fig. 1 is a vertical section of the illustrative structure taken longitudinally of and through the shaft axis.

Fig. 2 is a corresponding section of one of the end pieces of said structure.

Fig. 3 is a corresponding section of the inner bearing housing of such structure.

Fig. 4 is a view of said structure partly in end elevation and partly in cross section.

Fig. 5 is a detail sectional view of a fragment of the structure showing a minor modification.

Referring to the drawing by specific reference numerals, 1 designates a bearing bushing. This bushing is preferably of the material known as Bronzoil, which is a metallic composition comprising bronze and graphite in admixture therewith, adequately strong and otherwise satisfactory for the purposes of a bearing bushing and permeable by oil. However it is contemplated that embodiments of the invention may employ bushings of any suitable bearing metal or material and perforated midway for passage of oil through the bushing walls.

An annular bearing housing having its shaft bore lined by the bushing is provided in the illustrative structure by a steel ring or annular shell 2 and pressed steel annular end pieces 3 flanged and tightly interfitted with and fast to the end portions of said ring and formed with central tubular bushing holding extensions 3ª into which the bushing is pressed with a tight squeeze fit. The annular space enclosed by the parts mentioned provides an oil chamber 4 from which oil seeps through the medial portion of the bushing to its bore for lubricating the shaft journalled therein. An advantage of the Bronzoil bushing is that oil seeps through the entire medial portion thereof exposed in the oil chamber and also permeates more or less the portions of the bushing enclosed by the bushing holding portions 3ª of the housing. For introducing oil to said chamber, a suitable filling opening is provided preferably by a short tube or nipple 5 projecting from the ring 2 and interiorly threaded for engagement by the threads of a closure plug 6.

Holding the bushing 1 and the surrounding ring 2 in spaced and concentric relationship, the annular end pieces 3 in the illustrative structure carry the shaft load on the bearing from said surrounding ring which is supported in an outer housing through the medium of a sound insulating and cushioning ring 7 of non-metallic, elastic, load sustaining material such as rubber or the like, preferably the synthetic rubber known as Neoprene. The outer housing is represented as a two-piece strap type housing comprising separately connected base and cap members 8 and 9.

The ring 2 as well as the end pieces 3 may be stamped or pressed from sheet steel or other suitable metal. By forming these elements as steel stampings, with the end pieces 3 having circumferential flanges 3ᵇ enclosing and pressed on the end portions of the ring and united therewith all around by brazing, a light housing construction of strong and rigid character is obtained, with liquid tight joints between the interfitted parts. By machining the bushing 1 with an outer cylindrical surface concentric with its bore and pressing the bushing with a squeeze fit in the interiorly cylindrical bushing holding portions 3ª of the end pieces 3, leakage of oil around the bushing is prevented.

The flanges 3ᵇ in the illustrative structure fulfill an additional function of substantial importance in the type of construction in which the inner housing and cushioning ring as a unit is mounted either for ball play or for axial movement in the inner housing, namely to provide around the end portions of the steel ring 2 annular shoulders for engaging and laterally confining the cushioning ring 7 and retaining it against axial displacement relative to the inner housing. If desired, the flanges 3ᵇ may have their extreme portions upset or slightly flared, as indicated at 3ᶜ in Fig. 5, to increase the radial thickness of the retaining shoulders or, in other words, to increase the depth of the groove in which the cushioning ring 7 is fitted. Fig. 5 may be considered as exemplifying a construction in which the end pieces 3 are formed with circumferential flanges pressed on or tightly fitted around and brazed to the end portions of the ring 2 but with prolongations or extensions of said flanges to provide the annular shoulders for retaining the cushioning ring against axial displacement relative to the inner housing.

By giving to the annular end pieces 3 substantially the contour shown in the drawing, wherein the webs of said end pieces embody annular reverse bends rigidifying the webs and offsetting their central portions axially outward from their outer or circumferential portions, and the tubular bushing holding extensions 3ᵃ project from the inner peripheries of said webs through and past the planes of the extremities of the flanges 3ᵇ, the construction is well adapted for holding a bushing of substantially greater length than the length of the ring 2 and gives the advantages, first, that relatively long bushing holding portions 3ᵃ may extend axially inwardly or toward each other and wholly within the structure, and, second, that the load transferring end portions of the ring 2 and interfitted flanges 3ᵇ of the end pieces are in planes about midway of the lengths of said bushing holding portions 3ᵃ.

In the illustrative structure, the ring 2 is relatively short as compared with the bushing and relatively long as compared with the bushing holding portions 3ᵃ of the end pieces, giving a broad support for said ring through the medium of a broad cushioning ring 7 in the surrounding outer housing and giving a desirable wide spacing apart of the end pieces 3 so that they may be formed with relatively long bushing holding portions 3ᵇ extending axially inwardly and wholly within the housing structure, while at the same time leaving a substantial length of the medial portion of the bearing bushing 1 exposed in the oil chamber 4. In any particular design embodying the invention, the length of the ring 2 will depend upon various conditions, including the thickness and strength of the ring, the breadth of support desired therefor, the form and proportions of the cushioning ring 7, the clearance to be maintained between the inner and outer housings in the type of structure wherein the contacting surfaces of the cushioning ring and inner housing are spherical for ball play of the inner housing and cushioning ring as a unit in the outer housing, and the length of the bushing and desired spacing of the bushing carrying end pieces 3.

The described construction of the unit comprising the inner housing and bushing therein gives the general advantages of a relatively light construction of strong, rigid and practicable character, a relatively large capacity oil chamber, and a construction of simple character susceptible of economical manufacture, obviating foundry work and machining except for the casting and machining of the bushing which would have to be cast and machined in any event. The housing comprising a stamped or pressed steel ring 2 and pressed steel end pieces tightly interfitted with and brazed to the end portions of the ring can be manufactured at lower cost than a cast housing of similar size cored to provide the oil chamber, and is substantially less expensive than such a cored cast housing requiring machining of the groove for the cushioning ring or other extensive machining. Obviously an oil chamber of much greater capacity can be obtained with the described structure than with one of comparable size having a cast housing cored to provide the oil chamber. The lightness of construction also gives advantage in shipping costs. In this connection, the outer housing may be made of pressed steel parts of the construction disclosed in the Carver Patent No. 1,931,055 of October 17, 1933. Thus the whole bearing structure except the bushing and cushioning ring may be of pressed steel or sheet metal construction, giving a highly desirable light bearing structure as a whole.

The cushioning ring 7, holding the inner housing out of contact with and in operative relation to the outer housing, is shown as a broad ring of rubber or the like having a cylindrical inner surface and a spherical outer surface and narrow annular side surfaces, the cushioning ring being fitted around the ring 2 in the annular groove the side walls of which are provided by the flanges 3ᵇ and having a ball fit in the correspondingly interiorly spherical outer housing. It will be understood that the center of sphericity of the contacting spherical surfaces of the cushioning ring and outer housing is theoretically at the intersection of the bearing axis and medial plane of the cushioning ring, the diameter of such surfaces being appropriate to give desired thickness to the ring and maintain desired clearance between the inner surface of the outer housing and the circumferential flanged portions 3ᵇ of the inner housing. The form of ring shown can be easily molded in a two part mold, permits the use of a cylindrical ring 2, and gives a gradual increase in thickness toward the middle of the ring where the bearing load is greatest in the normal position of the bearing. The form and proportions of the ring are such as to give a cushion adequate to arbsorb minor vibrations but insufficiently yieldable to allow setting up objectionable shaft vibration.

The unit comprising the inner housing and bushing of the illustrative structure may be considered as exemplifying broadly an annular inner housing having therein a bearing for the shaft, typified by the bearing bushing lining the bearing holding portions of the housing. Though the present invention is of primary importance for plain type bearings, it is contemplated that features or subjects-matter embraced within the scope of the invention may be applicable to structures employing antifriction bearings for the journalling of the shaft in the inner housing.

Obviously the illustrative structure is susceptible of modification in details of construction and arrangement to meet various different requirements and conditions; moreover it is not indispensable that all the features of the invention be used conjointly, since different features or parts thereof may be advantageously used in various different combinations and subcombinations.

I claim as my invention:

1. A shaft bearing comprising a bushing, a pair of axially spaced bushing holding elements consisting of metal stampings formed as annular webs with central tubular extensions in which the bushing is press fitted, said webs being load transferring, annular load carrying means rigidly connecting the outer portions of said webs, a cushioning ring fitted around said means, and a housing in which through the medium of said cushioning ring the unit composed of the other mentioned parts is supported out of contact with said housing.

2. A shift bearing comprising a bushing, a pair of axially spaced bushing holding elements consisting of metal stampings formed as annular webs with central tubular extensions in which the bushing is press fitted, said webs being load transferring, and annular load carrying means rigidly connecting the outer portions of said webs, the structure composed of said parts being a rigid annular hollow oil holding unit from which oil can seep only through the walls of said bushing, said unit being adapted to be supported in a surrounding housing out of contact therewith through the medium of a cushioning ring fitted around said means, said stampings having circumferential portions projecting radially slightly beyond the seat for such cushioning ring and adapted to engage the sides thereof to retain it against axial displacement relative to said unit.

3. A shaft bearing comprising a bushing, a surrounding ring consisting of a tubular metal piece, and a pair of axially spaced bushing holding elements consisting of metal stampings formed as annular webs with central tubular extensions in which the bushing is press fitted and with flanges interfitted with and fast to said ring, said stampings rigidly connecting said ring and bushing in concentric and spaced relationship, the web portions of said stampings being load transferring, the structure composed of said parts being a rigid annular hollow oil holding unit from which oil can seep only through the walls of said bushing, said unit adapted to be supported through the medium of a cushioning ring fitted around its periphery in a surrounding housing out of contact therewith.

4. A shaft bearing comprising a bushing, a surrounding ring consisting of a tubular metal piece, and a pair of axially spaced bushing holding elements consisting of metal stampings formed as annular webs with central tubular extensions in which the bushing is press fitted and with flanges interfitted with and fast to said ring, said stampings rigidly connecting said ring and bushing in concentric and spaced relationship, the web portions of said stampings being load transferring, said web portions embodying reverse bends whereby their central portions are offset axially outward relative to their circumferential portions, said bushing holding extensions projecting axially inwardly from said webs past the planes of said circumferential portions and wholly within the structure, the structure composed of said parts being a rigid annular hollow oil holding unit from which oil can seep only through the walls of said bushing, said unit adapted to be supported through the medium of a cushioning ring fitted around its periphery in a surrounding housing out of contact therewith.

5. A shaft bearing comprising a bushing, a load carrying ring therearound, and a pair of axially spaced bushing holding elements consisting of metal stampings affixed to the end portions of and carried by said ring and carrying the bushing therefrom in concentric and spaced relation thereto, said stampings being formed as annular webs with flanges interfitted with and fast to said ring and with central tubular extensions in which the bushing is press fitted the web portions of said stampings being load transferring and radially spacing said tubular extensions from said flanges, the structure composed of said parts being adapted to be supported in a surrounding housing out of contact therewith through the medium of a cushioning ring fitted around said load carrying ring.

6. A shaft bearing comprising a bushing, a load carrying ring therearound, and a pair of axially spaced bushing holding elements consisting of metal stampings affixed to the end portions of and carried by said ring and carrying the bushing therefrom in concentric and spaced relation thereto, said stampings being formed as annular webs with flanges interfitted with and fast to said ring and with central tubular extensions in which the bushing is press fitted, the structure composed of said parts being adapted to be supported in a surrounding housing out of contact therewith through the medium of a cushioning ring fitted around said load carrying ring, said flanges of said stampings enclosing the end portions of said load carrying ring and providing therearound annular shoulders of low elevation for cooperation with the sides of such cushioning ring to retain it against axial displacement relative to said load carrying ring.

7. An annular hollow bearing housing comprising a metal ring and end pieces consisting of annular metal stampings affixed to and rigidly connected by said ring, said stampings being formed with central tubular bearing holding portions and outer flanges and intervening load transferring webs radially spacing said flanges and bearing holding portions, said flanges being tightly interfitted with and fast to said ring, the circumferential portions of said stampings projecting radially slightly beyond the end portions of said ring and forming annular shoulders of low elevation whereby to engage the sides of a cushioning ring fitted around said first mentioned ring.

8. An annular hollow bearing housing comprising a metal ring and end pieces consisting of annular metal stampings affixed to and rigidly connected by said ring, said stampings being formed with central tubular bearing holding portions and outer flanges and intervening load transferring webs radially spacing said flanges from said bearing holding portions, said flanges enclosing and tightly fitted around the end portions of said ring and fast thereto and forming therearound annular shoulders of low elevation whereby to engage the sides of a cushioning ring fitted around said first mentioned ring.

9. An annular hollow bearing housing comprising a metal ring and end pieces consisting of annular metal stampings affixed to and rigidly connected by said ring, said stampings being formed with central tubular bearing holding portions and outer flanges and intervening load transferring webs radially spacing said flanges from said bearing holding portions, said flanges being tightly interfitted with and fast to said ring, said webs embodying reverse bends whereby their central portions are offset axially outward from their circumferential portions, and said bearing holding portions projecting axially inwardly toward each other past the planes of said circumferential portions and wholly within the structure.

10. An annular hollow bearing housing comprising end pieces and a connecting ring, the latter consisting of a tubular metal stamping and said end pieces consisting of annular metal stampings formed with flanges tightly interfitted with and united to the end portions of said ring by brazing, said end pieces being formed with central tubular bearing holding portions and embodying load transferring webs radially spacing said bearing holding portions from said flanges.

DAVID FIRTH.